US005086658A

United States Patent [19]

Isozumi

[11] Patent Number: 5,086,658

[45] Date of Patent: Feb. 11, 1992

[54] COAXIAL ENGINE STARTER

[75] Inventor: Shuzou Isozumi, Himeji, Japan

[73] Assignee: Mitsubishi Denki K.K., Tokyo, Japan

[21] Appl. No.: 586,646

[22] Filed: Sep. 24, 1990

[30] Foreign Application Priority Data

Sep. 26, 1989 [JP] Japan .................................. 1-249621
Nov. 9, 1989 [JP] Japan .................................. 1-131421

[51] Int. Cl.[5] ........................ F02N 11/00; F16H 57/02

[52] U.S. Cl. ........................................ 74/7 E; 74/7 A; 74/606 R; 290/48

[58] Field of Search .................... 74/7 E, 7 A, 606 R, 74/6; 475/345, 346, 902, 331; 290/48

[56] References Cited

U.S. PATENT DOCUMENTS

| | | | |
|---|---|---|---|
| 4,183,266 | 1/1980 | Osumi | 475/331 X |
| 4,517,858 | 5/1985 | Schafer | 475/331 X |
| 4,671,125 | 6/1987 | Yabunaka | 74/7 A X |
| 4,712,451 | 12/1987 | Morishita et al. | 475/345 |
| 4,760,274 | 7/1988 | Isozumi | 290/48 |
| 4,776,225 | 10/1988 | Morishita et al. | 475/345 X |
| 4,800,766 | 2/1989 | Isozumi | 74/7 E |
| 4,808,836 | 2/1989 | Isozumi et al. | 74/6 X |
| 4,848,172 | 7/1989 | Morishita | 475/345 X |
| 4,896,550 | 1/1990 | Hikichi et al. | 74/7 E X |
| 4,926,706 | 5/1990 | Isozumi | 74/7 A |
| 4,945,777 | 8/1990 | Isozumi | 74/7 E |

*Primary Examiner*—Allan D. Herrmann
*Assistant Examiner*—Julie Krolikowski
*Attorney, Agent, or Firm*—Sughrue, Mion, Zinn, Macpeak & Seas

[57] ABSTRACT

A coaxial engine starter comprising a d.c. electric motor (11), a planetary speed reduction gear unit (20), a unidirectional clutch and a pinion. The planetary gear unit (20) includes a large-diameter inner gear member (17) mounted to the front end of the motor housing (11*a*). The clutch and the pinion are housed within a front machine frame (21) attached to the inner gear member. The inner gear member (17) is securely held in place between the motor housing (11*a*) and the front machine frame (21) by U-shaped connectors (22) and through bolts (23) fastening the front machine frame (21), the inner gear member (17) and the motor housing (11*a*) together. Alternatively, the inner gear member (27; 37) including gear teeth (27*a*; 38*a*) may be directly thread-engaged by the through bolts (32) positioned radially inward of the inner gear teeth (27*a*; 38*a*) and the front machine frame (29) may be attached to the inner gear member (27; 37). The inner gear teeth of the inner gear member may be integrally formed in the member (27*a*) or formed in a separate gear element (38).

12 Claims, 5 Drawing Sheets

COAXIAL ENGINE STARTER

BACKGROUND OF THE INVENTION

This invention relates to a coaxial engine starter and, more particularly, to a coaxial engine starter with a planetary speed reduction gear unit.

Japanese Utility Model Laid-Open No. 63-136262 illustrates one type of the coaxial engine starter in which through bolts for securing a d.c. motor, a solenoid switch and a front machine frame together are positioned to extend outside of the starter housing. Another coaxial engine starter is illustrated in Japanese Utility Model Laid-Open No. 63-168276 in which securing through bolts are positioned inside of the starter housing.

In the coaxial engine starter of the first type in which the through bolts are positioned outside of the housing, the diameter of the inner gear of the planetary speed reduction gear unit disposed within the front machine frame can be made large, so that the number of teeth of the inner gear and accordingly the speed reduction ratio of the planetary speed reduction gear unit can be made large. On the other hand, the through bolts disposed outside of the machine frame impose limitations in the mounting arrangement of the starter on the engine because the outside through bolts decrease the degree of freedom in designing the starter.

In the coaxial engine starter of the second type in which the through bolts are disposed within the machine frame, the diameter of the inner gear of the planetary speed reduction gear unit must be made small by the amount corresponding to the through bolts, so that the speed reduction ratio cannot be made large.

Generally, the relationship between the volume of the armature of a d.c. electric motor and the speed reduction ratio between the d.c. motor and an engine can be expressed by the following equation:

$$Da^2Lc \propto Te/g.I.\sqrt{Rs}$$

where;

Da: outer diameter of an armature core of a d.c. motor
Lc: axial dimension of the armature core
Te: engine torque
g: gear ratio
I: driving current
Rs: resistance of the starter motor As apparent from the above equation, the volume of the armature is in reverse proportion to the gear ratio or the speed reduction ratio of the planetary speed reduction gear unit, so that decreasing the volume of the armature is extremely difficult when the above speed reduction ratio cannot be increased. Particularly with the coaxial engine starter, since armature rotary shaft forming a sun gear of the planetary speed reduction gear unit is hollow and provided with an output rotary shaft therein, the diameter of the pitch circle of the sun gear must be greater than a predetermined value when taking the mechanical strength of the output rotary shaft and the tooth deddendum of the sun gear, so that the speed reduction ratio cannot be made large when the diameter of the inner gear is limited. Therefore, the resulting engine starter has large overall dimensions and is heavy, posing a problem in the layout for mounting the starter to the engine and in reducing weight.

SUMMARY OF THE INVENTION

Accordingly, one object of the present invention is to provide a coaxial engine starter free from the above discussed problems of the conventional coaxial engine starter.

Another object of the present invention is to provide a coaxial engine starter small in size and light in weight.

A further object of the present invention is to provide a coaxial engine starter in which through bolts for securing machine frames are disposed within the machine frames.

Still another object of the present invention is to provide a coaxial engine starter in which the diameter of an inner gear of a planetary speed reduction gear can be made large.

Another object of the present invention is to provide a coaxial engine starter which has a greater degree of freedom in the arrangement of mounting to an engine.

A further object of the present invention is to provide a coaxial engine starter which is low in gear noise.

With the above objects in view, the coaxial engine starter according to the present invention comprises a d.c. electric motor including a machine frame and generating a rotational force for starting an engine, a front machine frame disposed on the front end of the electric motor and having a drive force transmission mechanism, and a planetary speed reduction gear unit including an inner gear member. The inner gear member is securely held between the motor frame and the front machine frame by substantially U-shaped connectors having a first end attached to the front machine frame and a second end connected to the through bolts axially extending within the machine frame of the electric motor.

In another embodiment of the present invention, the coaxial engine starter may comprise a plurality of first through bolts axially extending within the motor yoke of the electric motor to thread engage with an end face of the inner gear member at a yoke side end face thereof, thereby to fasten the motor yoke and the inner gear defining member. The first through bolts preferably have radial positions equal to or radially inner than the radial position of the inner gear teeth of the inner gear member. The front machine frame may be fastened to the inner gear memeber by a plurality of second through bolts. The inner gear member may be a ring-shaped member comprising an inner gear teeth integrally formed in an inner circumference surface thereof or a substantially ring-shaped main body and a ring-shaped inner gear element made preferably of a molded resin and having an inner gear teeth.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
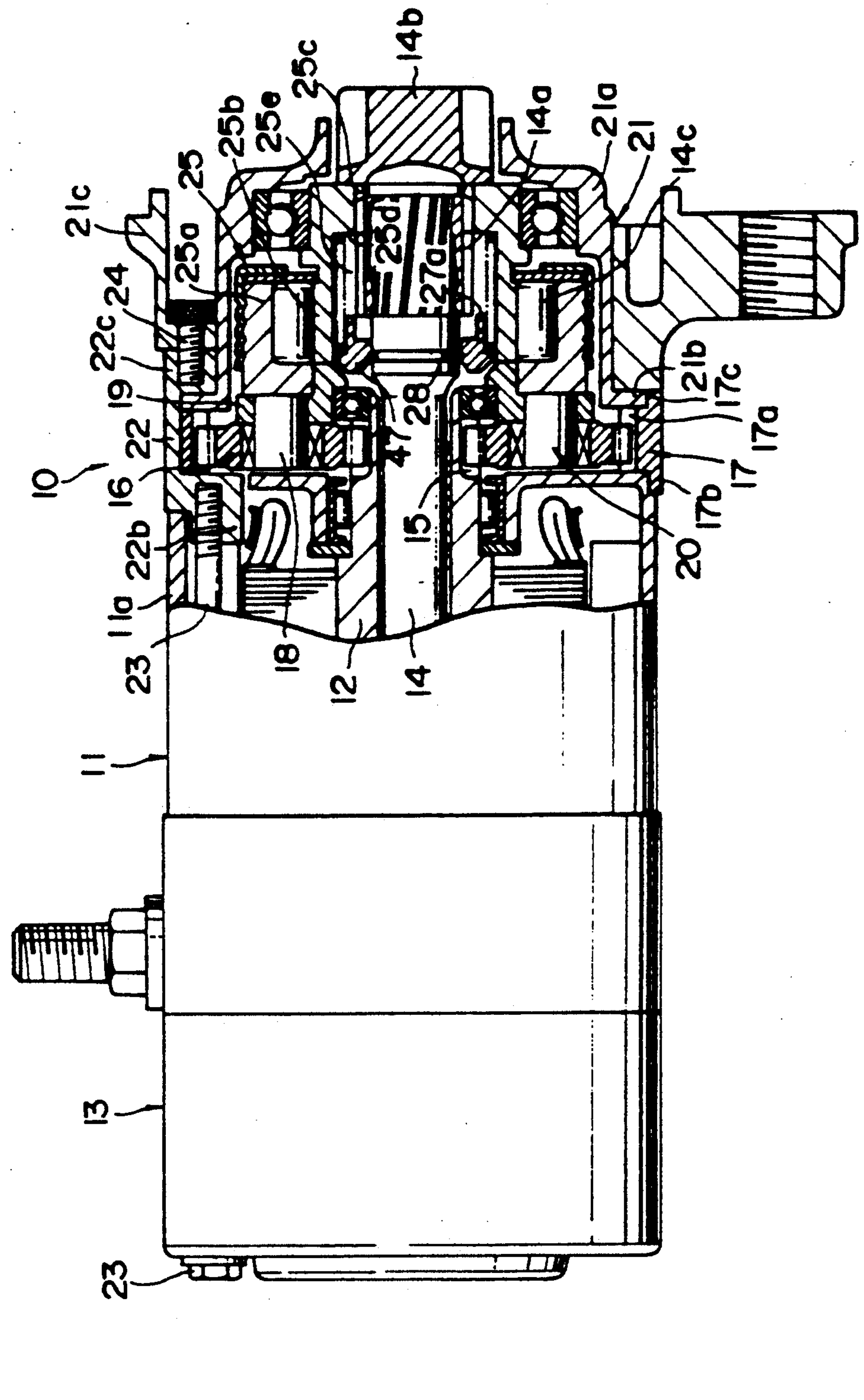
FIG. 1 is a partial sectional side view illustrating one embodiment of a coaxial engine starter of the present invention.

FIG. 1 illustrates a coaxial engine starter 10 of the present invention which comprises a d.c. electric motor 11 having a hollow armature rotary shaft 12 and a solenoid switch 13 disposed at the rear end of the electric motor 11 and having an operating rod (not shown) slidably extended through the hollow armature rotary shaft 12. An output rotary shaft 14 coaxially disposed at the front end of the armature rotary shaft 12 and having a rear end inserted into the hollow armature rotary shaft 12 is also provided as to be allowed to be pushed forward by the front end of the operating rod of the solenoid switch.

In the coaxial engine starter of such the construction, the armature rotary shaft has formed on its front outer circumferential end a sun gear 15, to which a plurality of planetary gears 16 are brought into engagement. There planetary gears 16 engage the gear teeth **17*a* of a ring-shaped inner gear member 17 disposed at the front end of the machine frame 11*a* of the d.c. motor 11 and are rotatably supported by shafts 18 on a carrier 19. The planetary speed reduction gear unit 20 which is constituted with these components of the sun gear 15, the planetary geares 16, inner gear member 17, the shafts 18 and the carrier 19 can reduce the speed of rotation of the armature rotary shaft 12**.

Figure 2:
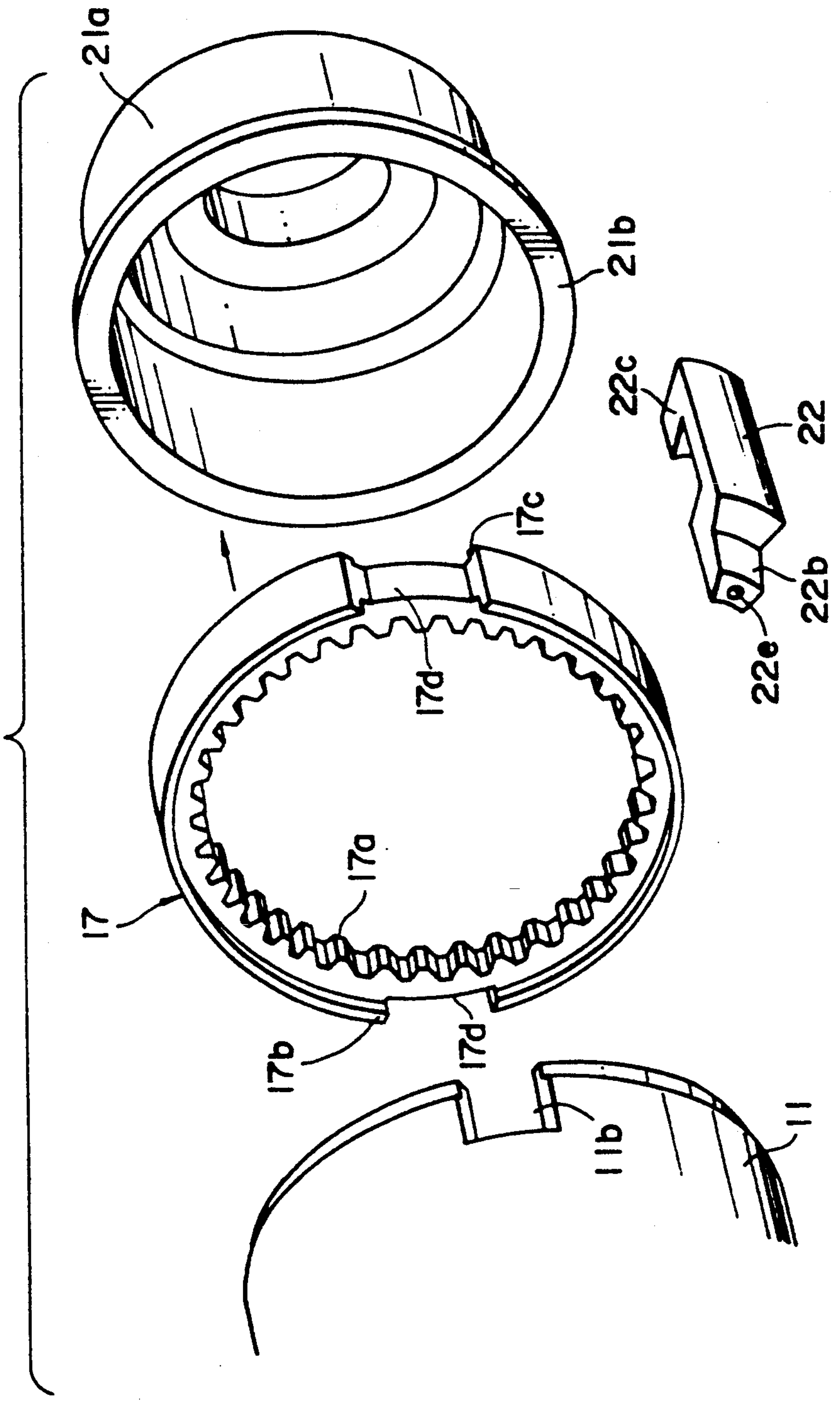
FIG. 2 is an exploded perspective view of some parts of the coaxial engine starter illustrated in FIG. 1 for illustrating the relationship between the motor housing, the inner gear member, the front machine frame and the connector.
Figure 3:
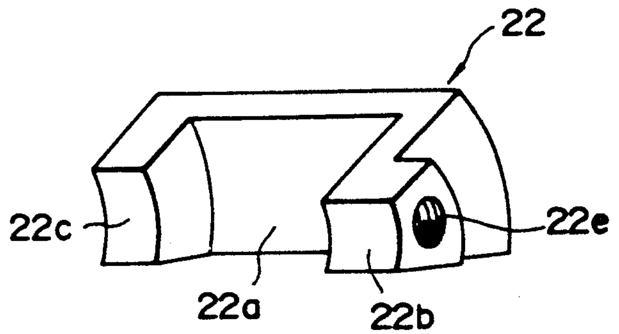
FIG. 3 is a perspective view of the connector illustrated in FIG. 2.

As best seen in FIGS. 1 and 2, the ring-shaped inner gear member 17 of the planetary speed reduction gear unit 20 has a substantially T-shaped cross section constituted by the teeth section **17*a* corresponding to the vertical leg of the "T" and two side flanges 17*b* and 17*c* corresponding to the lateral bar of the "T". The inner gear member 17 has formed in the outer periphery thereof a pair of diametrically spaced notches 17*d* having a depth slightly greater than the thickness of the side flanges 17*b* and 17*c*. Therefore, the width of the gear teeth section 17*a* narrower than that of the side flanges 17*b* and 17*c* is exposed through the notches 17*d* fitted into the inner circumference of the side flange 17*c* of the inner gear member 17 is a radially outwardly extending flange 21*b* at the rear end of the front housing 21*a* which is a part of a front machine frame 21 as illustrated in FIG. 1. Then, a connector 22, as shown in FIGS. 2 and 3, which is a substantially U-shaped member having a recess 22*a* defined between two legs 22*b* and 22*c* is fitted at each notch 17*d* of the inner gear member 17 in such a manner that the recess 22*a* receives therein the inner gear teeth 17*a* of the inner gear member 17 and the flange 21*b* of the front housing 21*a* together. It is to be noted that the first leg 22*c* at the front end (right end as viewed in FIG. 1) of the U-shaped connector 22 has a threaded hole 22*d* and the second leg 22*b* at the rear end (left end as viewed in FIG. 1) of the U-shaped connector 22 has a threaded hole 22*e***.

The inner gear member 17 assembled into the front housing **21*a* by the connectors 22 as above described is mounted to the front end of the machine frame 11*a* of the d.c. motor 11 in a spigot-joint relationship in that the side flange 17*b* of the inner gear member 17 fits into the step-shaped recess formed at the front end of the machine frame 11*a*. At this time, the rear or the second end 22*b* of the connector 22 is inserted into the interior of the machine frame 11*a* from a notch 11*b* formed at the positions on the front end of the machine frame 11*a* corresponding to the notches 17*d* in the inner gear member 17. The second end 22*b* of the connector 22 is thread-engaged at its threaded hole 22*d* by the front end of the through bolts 23 which extend from the rear end of the solenoid switch unit 13 to secure the connectors to the motor housing 11*a*. Thus, the d.c. motor 11 is securely held between the solenoid switch unit 13, the inner gear member 17 (or more precisely, the connectors 22) to provide a unitary assembly including the solenoid switch 13, the d.c. motor 11, the inner gear member 17 and the front machine frame 21*a* connected together by the through bolts 23 and the connectors 22. On the other hand, on the front machine frame 21*a* assembled to the inner gear member 17, a mounting bracket 21*c* for mounting the starter 10 to an unillustrated engine is fitted and secured by bolts 24**.

Within the housing 21 constituting the front machine frame **21*a*, an over-running clutch unit 25, which is a part of a drive force transmission mechanism and which has a clutch outer member 25*a* fitted over the outer periphery of the front end cylindrical portion of the carrier 19, is placed over the output rotary shaft 14. The clutch otuer member 25*a* is fitted onto the front end cylindrical portion of the carrier 19 in such a relationship that a relative slippage occurs therebetween upon the ocurrence of an abonormal impact on the over-running clutch unit 25**, thereby moderating the impact.

The clutch inner member **25*b* has formed on the front end thereof a splined portion 25*c* having inner splines engaging helical splines 14*a* of the output rotary shaft 14. Thus, the rotation of the armature rotary shaft 12 is transmitted to the clutch outer member 25*a* through the planetary speed reduction gear unit 20 and then from rollers 14*c* to the output rotary shaft 14 through the clutch inner member 25*b* and the helical splines 14*a*. The clutch inner member 25*b* of the over-running clutch unit 25 also has formed therein a space 25*e* defined by an enlarged diameter portion which has an inner diameter greater than the outer diameter of the helical splines 14*a* formed in the outer circumference of the output rotary shaft 14 and which extends over about two thirds from the rear end of the clutch inner member 25*b*. Disposed within the rear end of the space 25*e* defined in the clutch inner member 25*b* is a ring-shaped stopper member 47 held on the output rotary shaft 14 by a stop ring 28. Therefore, the stopper member 47 is moved forward within the space 25*e* in the clutch inner member 25*b* when the output rotary shaft 14 is pushed forward by a rod actuated by the solenoid switch 13, and the stopper member 47 abuts at its front end 27*a* against a step 25*d* (a rear end face of the splined portion 25*c*) defined between the splined portion 25*c* and the enlarged inner diameter portion of the clutch inner member 25*b* when the pinion 14*b* integrally formed on the output rotary shaft 14** meshes with an engine ring gear (not shown).

According to the coaxial engine starter 10 as above constructed, the through bolts 23 aranged to extend through the interior of the coaxial engine starter are thread-engaged with the connectors 22, without passing through the position in which the inner gear member 17 constituting the planetary speed reduction gear unit 20 is disposed, thereby to secure the case of the solenoid switch 13, the machine frame 11*a* of the d.c. motor 11, the inner gear member 17 and the front machine frame 21 together. Therefore, the inner gear member 17 can be made to have a large inner diameter, allowing the gear ratio to become high, and since the through bolts 23 are positioned inside of the machine frame, they do not impose any problem in mounting the starter to an engine, whereby a coaxial engine starter which is compact and easy in mounting to an engine can be provided.

Figure 4:
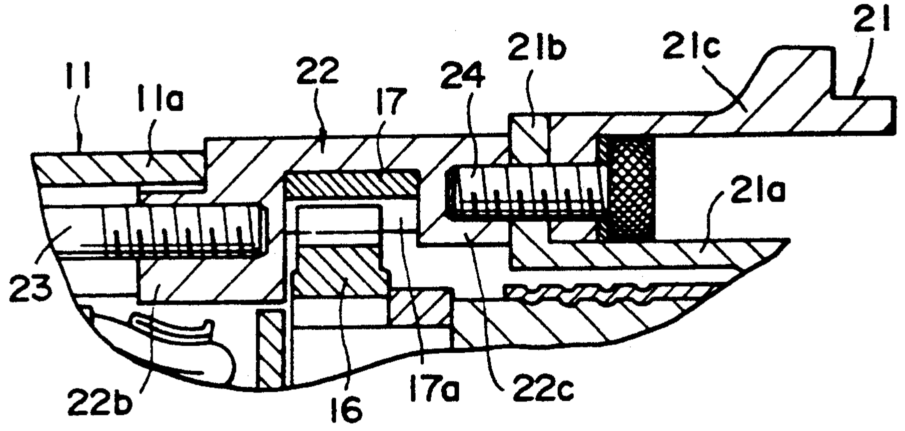
FIG. 4 is a fragmental sectional view illustrating another embodiment of the present invention.

FIG. 4 illustrates another embodiment of the present invention in which the housing 21*a* is attached to the connectors 22 by placing the radial flange 21*b* at the rear end of the housing 21*a* on the outer surface of the front leg 22*c* of the U-shaped connectors 22 and securing it by the bolts 24 which also extends through the radially inward flange of the mounting bracket 21*c*.

Figure 5:
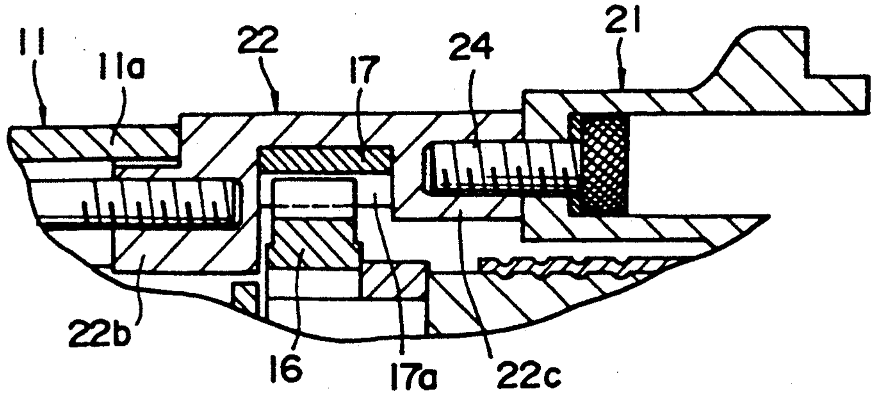
FIG. 5 is a fragmental sectional view illustrating a still another embodiment of the present invention.

FIG. 5 illustrates still another embodiment of the present invention in which the housing 21*a* and the mounting bracket 21*c* are integral member connected at the portion corresponding to the radial flanges of the housing 21*a* and the bracket 21*c* illustrated in FIG. 4.

Also, while the connector 22 illustrated in FIGS. 2 and 3 is of an integral structure, the connector 22 may be composed of a plurality of components.

According to the above described embodiments of the coaxial engine starter of the present invention, special connectors are employed to assemble the machine frames and the inner gear member of the planetary speed reduction gear together, so that the diameter of the inner gear of the inner gear member can be made large and therefore the speed reduction ratio can be increased, whereby the coaxial engine starter can be made small-sized and easy to install on an engine.

Figure 6:
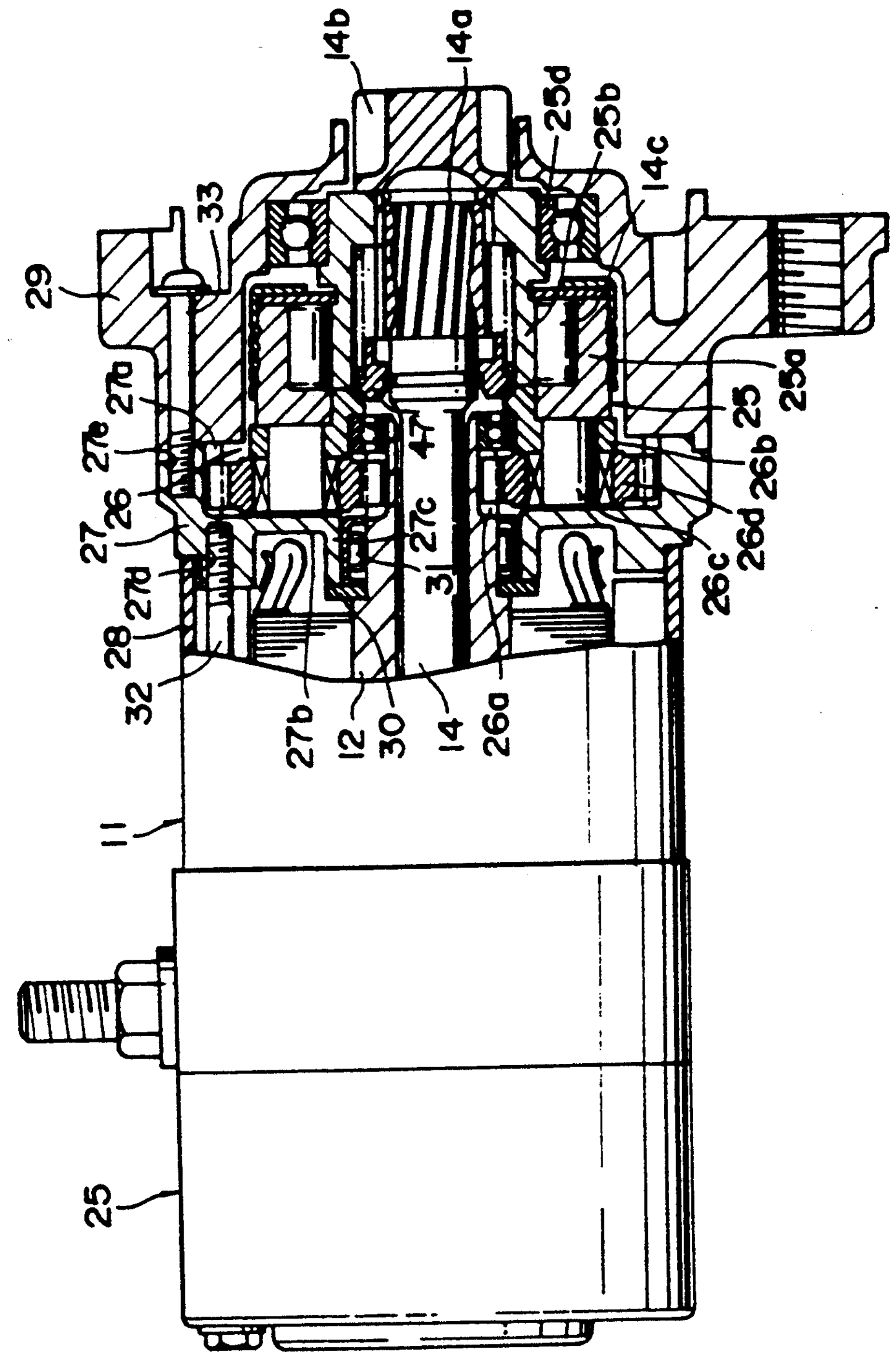
FIG. 6 is a partial sectional side view of another embodiment of the coaxial engine starter of the present invention.

FIG. 6 illustrates another coaxial engine starter of the present invention, in which the planetary speed reduction gear unit 26 comprises a sun gear 26*a* at the front end of the armature rotary shaft 12, an inner gear teeth 27*a* formed in the inner circumference of the inner gear member 27 and a plurality of planetary gears 26*d* rotatably supported on the support shafts 26*c* secured on the carrier 26*b* and in mesh with the sun gear 26*a* and the inner gear teeth 27*a*.

The inner gear member 27 is a substantially cup-shaped member positioned between the yoke 28 and the front machine frame 29 constituting the housing of the d.c. motor 11 and engaged thereto by spigot joints. The inner gear member 27 has inner gear teeth 27*a* formed in the inner circumferential surface of the cup-shaped member 27 at a radial position substantially equal to the radial position of threaded holes 27*d* which will be described later. Also, the inner gear member 27 has a center plate 27*b* corresponding to the bottom wall of the cup which is a partition between the d.c. motor 11 and the planetary speed reduction gear unit 26. The center plate 27*b* has a hollow cylinder 27*c* which supports a thrust bearing 30 and a radial bearing 31 on the armature rotary shaft 12. The threaded holes 27*d* on the rear end of the inner gear member 27 receives therein threaded ends of first through bolts 32 which extend from the rear end of the solenoid switch 25 through the interior of the switch and through the yoke 28 of the d.c. motor 11, thereby securely connecting the solenoid switch 25, the d.c. motor 11 and the inner gear member 27. The inner gear member 27 also has formed at its front end or at the edge of the cup a plurality of threaded holes 27*e* into which rear threaded ends of second through bolts 33 engage to connect the front machine frame 29 to the inner gear member 27.

With the coaxial engine starter thus constructed, the through bolts do not pass through the inner gear teeth 27*a* of the inner gear member 27, so that no limitation due to the presence of the through bolts is imposed on the diameter of the inner gear teeth 27*a* of the inner gear member 27. In the above-described embodiment, for example, the diameter of the inner gear teeth 27*a* can be made equal to the diameter of the circle at which the first through bolts 32 are positioned, so that the number of inner gear teeth 27*a* of the inner gear member 27 can be made large, resulting in a higher speed reduction ratio of the planetary speed reduction gear unit 26. Moreover, since the first through bolts 32 are disposed inside of the yoke 28 and the second through bolts 33 are disposed inside of the front machine frame 29, the bolts do not project outside of the machine frame, thus providing a coaxial engine starter that can be easily mounted to an engine.

Figure 7:
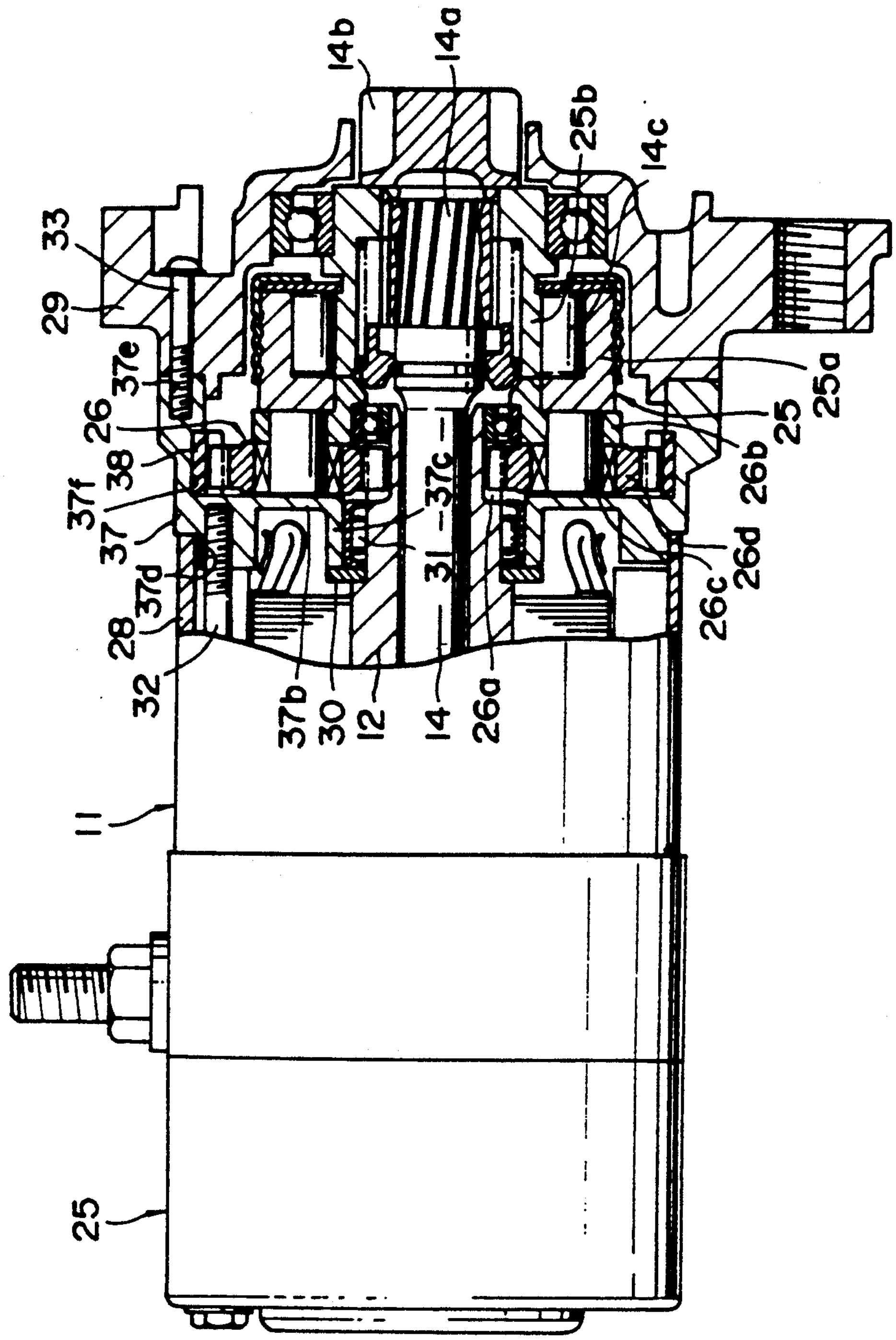
FIG. 7 is a partial sectional side view of a further embodiment of the coaxial engine starter of the present invention.

FIG. 7 illustrates still another embodiment of the coaxial engine starter of the present invention, in which the substantially cup-shaped inner gear member 37 comprises a substantially ring-shaped inner gear element 38 which is a resin component separate from the inner gear member 37 and integrally molded within an annular groove 37*f* formed in the inner circumference of the cup-shaped inner gear member 37. The inner gear element 38 has inner gear teeth 38*a* in its inner circumference. It is seen that threaded holes 37*d* into which the first through bolts 32 are thread-engaged are at the radial positions inside of the bottom surface of the annular groove 37*f* of the inner gear member 37. It is also seen that the threaded holes 37*e* in which the second through bolts 33 thread-engaged are substantially at the same radial positions as the bottom surface of the annular groove 37*f* of the inner gear member 37 and that the second through bolts 33 do not overlap the inner gear element 38 in the radial direction. In other respects, the arrangement is substantially the same as that illustrated and described in conjunction with the embodiment shown in FIG. 6.

With the coaxial engine starter thus constructed, the through bolts do not pass through the inner gear element 38 of the inner gear member 37, so that the diameter and therefore the number of teeth of the inner gear element 38 can be made large, resulting in a higher speed reduction ratio of the planetary speed reduction gear unit. Moreover, since the inner gear element 38 is made of a resin material, the noise that generates at the meshing inner gear element 38 and the planetary gears can be significantly reduced.

What is claimed is:

1. A coaxial engine starter, comprising:
   - a d.c. electric motor including a motor frame and generating a rotational force for starting an engine;
   - a front machine frame disposed on a front end of said electric motor and having a drive force transmission mechanism disposed therein;
   - a planetary speed reduction gear unit including an inner gear disposed between said electric motor and said front machine frame;
   - a plurality of first through bolts axially extending within said machine frame of said electric motor from a rear end thereof toward a front end thereof; and a plurality of u-shaped connectors having a first end attached to said front machine frame utilizing a plurality of second bolts and a second end engaged with said first through bolts, said connectors extending across opposite sides of said inner gear, whereby said inner gear is securely held in place between said motor frame and said front machine frame.

2. The starter of claim 1 wherein said inner gear includes radial notched portions on the outer circumference thereof for receiving said connectors.

3. A coaxial engine starter as claimed in claim 1, wherein said front machine frame has a radial extension at which said front machine frame is caught in an engagement with said first end of said connectors.

4. A coaxial engine starter as claimed in claim 3, wherein said radial extension of said front machine frame engages inside of said "U" of said connector.

5. A coaxial engine starter as claimed in claim 3, wherein said radial extension of said front machine frame is secured to said connectors by screws.

6. A coaxial engine starter as claimed in claim 1, further comprising a mounting bracket secured to said front machine frame by screws for mounting the engine starter to the engine.

7. A coaxial engine starter as claimed in claim 6, wherein said front machine frame has a radial extension which is connected to said mounting bracket.

8. A coaxial engine starter comprising:

a d.c. electric motor including a motor yoke and generating a rotational force for starting an engine;

a front machine frame disposed on a front end of said electric motor and having a drive force transmission mechanism disposed therein;

a planetary speed reduction gear unit including an inner gear member having inner gear teeth in an inner circumference thereof and disposed between said motor yoke and said front machine frame;

a plurality of first through bolts axially extending within said motor yoke of said electric motor from a rear end thereof toward a front end thereof to thread engage with an end face of said inner gear member at a yoke side end face thereof, thereby to fasten said motor yoke and said inner gear member; and a plurality of second through bolts thread engaged with an opposite end face of said inner gear member to fasten said front machine frame and said inner gear member.

9. A coaxial engine starter as claimed in claim 8, wherein said first through bolts have radial positions equal to or radially inner than that of said inner gear teeth of said inner gear member.

10. A coaxial engine starter as claimed in claim 8, wherein said first and second through bolts are spaced apart in the axial direction and said inner gear teeth of said inner gear member has a radial position between said first and second through bolts.

11. A coaxial engine starter as claimed in claim 8, wherein said inner gear member comprises a substantially ring-shaped member having an inner gear teeth integrally formed in an inner circumference surface thereof.

12. A coaxial engine starter as claimed in claim 8, wherein said inner gear member comprises a substantially ring-shaped main body and a substantially ring-shaped inner gear element made of a molded resin and having an inner gear teeth.

* * * * *